United States Patent [19]

Bruce

[11] Patent Number: 4,627,232
[45] Date of Patent: Dec. 9, 1986

[54] LINK CHAIN
[75] Inventor: Peter Bruce, Onchan, Isle of Man
[73] Assignee: Brupat Limited, Onchan, United Kingdom
[21] Appl. No.: 690,492
[22] PCT Filed: May 8, 1984
[86] PCT No.: PCT/GB84/00154
§ 371 Date: Jan. 3, 1985
§ 102(e) Date: Jan. 3, 1985
[87] PCT Pub. No.: WO84/04370
PCT Pub. Date: Nov. 8, 1984

[30] Foreign Application Priority Data
May 5, 1983 [GB] United Kingdom ............... 8312251
[51] Int. Cl.⁴ .......................................... F16G 13/06
[52] U.S. Cl. .......................................... 59/84; 59/78
[58] Field of Search .................. 59/78, 84, 86, 90, 93, 59/5

[56] References Cited
U.S. PATENT DOCUMENTS

| | | | |
|---|---|---|---|
| 1,806,733 | 5/1931 | Bell et al. | 59/84 |
| 2,103,972 | 12/1937 | Harris | 59/84 |
| 2,650,470 | 9/1953 | Sennholtz | 59/90 |
| 3,014,340 | 12/1961 | Van der Waals | 59/78 |
| 3,662,539 | 5/1972 | Florjancic | 59/84 |
| 3,744,239 | 7/1973 | L'Anson | 59/90 |
| 3,864,906 | 2/1975 | Cullen | 59/84 |
| 4,497,169 | 2/1985 | Millington | 59/90 |

FOREIGN PATENT DOCUMENTS

| | | | |
|---|---|---|---|
| 48417 | 12/1888 | Fed. Rep. of Germany | 59/90 |
| 922386 | 1/1955 | Fed. Rep. of Germany | 59/90 |

Primary Examiner—Francis S. Husar
Assistant Examiner—David B. Jones
Attorney, Agent, or Firm—Mason, Fenwick & Lawrence

[57] ABSTRACT

A chain comprises interconnected links with each link comprising opposed C-shaped ends joined by joining limb portions. Each C-shaped end includes a central crown with shoulders on either side of the crown, and by the present invention the section modulus about an axis perpendicular to the plane of the link of a cross-section at a shoulder is greater than the corresponding section modulus of a cross-section at the crown, and preferably additionally said section modulus of the section at the shoulder is greater than a corresponding section modulus of a cross-section at the associated joining limb portion.

13 Claims, 15 Drawing Figures

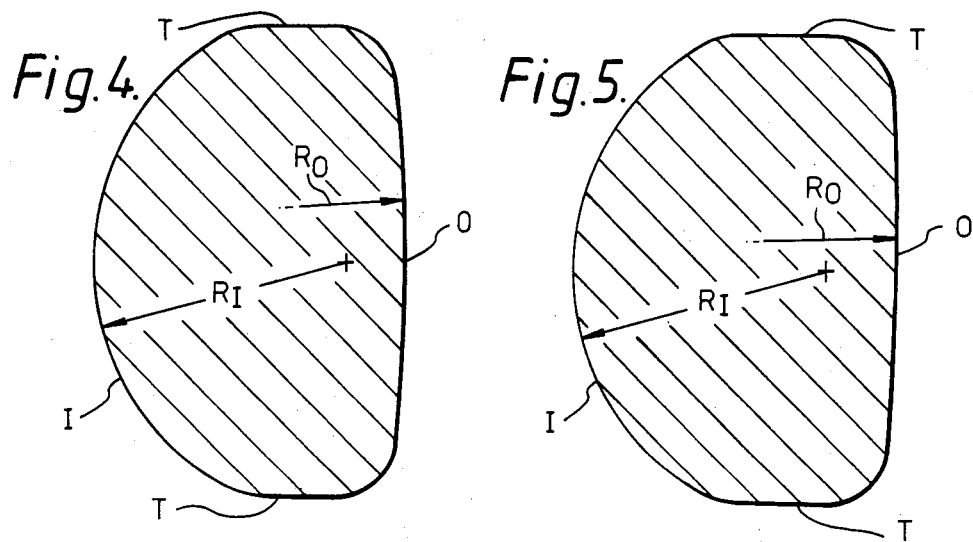
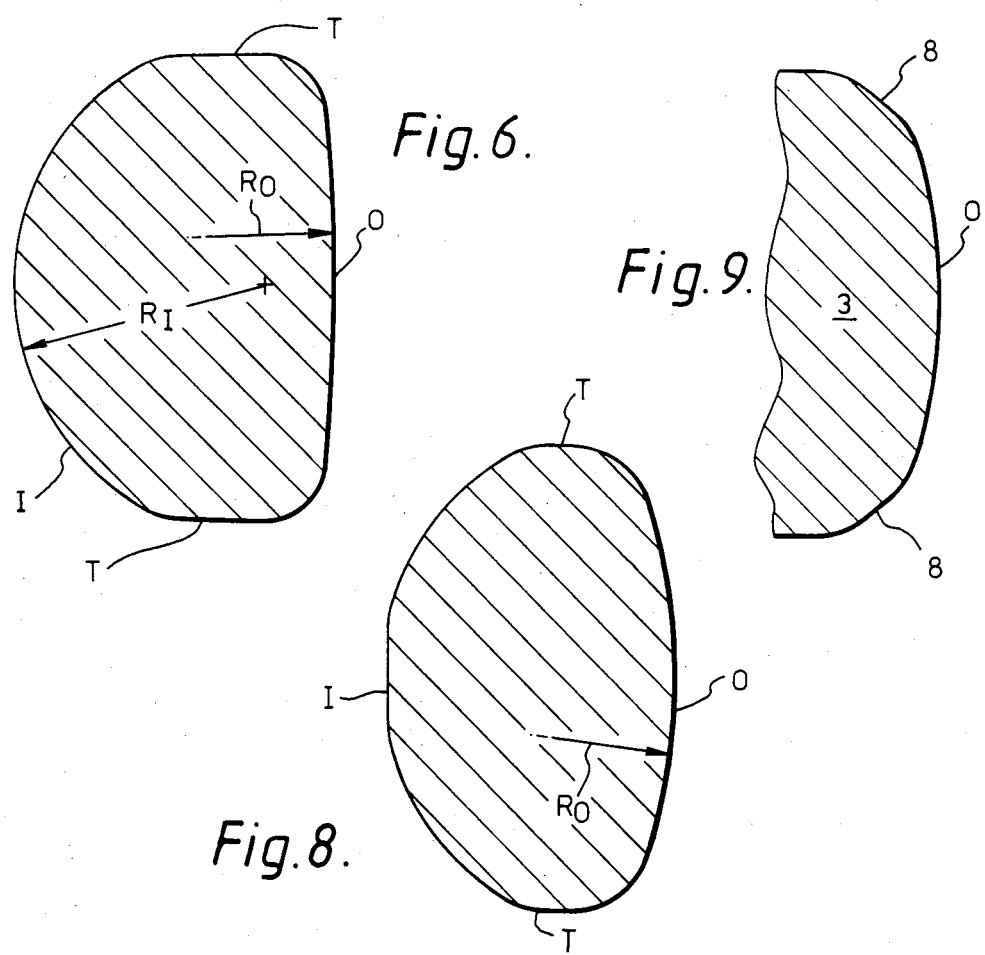

LINK CHAIN

The present invention relates to link chain made up of interconnecting links of opposed U-form.

The above type of link chain is well known and generally has double curvature surfaces for transferring load from link to link. This link chain most commonly has its links manufactured from uniform (e.g. round) bar by bending the bar into opposed U-form and welding the adjacent ends of the bent bar to form a substantially elliptical link. A central strut known as a "stud" is often provided at the minor diameter of the ellipse to strengthen the link. The links of these prior art chains therefore have a substantially circular limb cross section; and these prior art chains are generally deployed around pocketed driving wheels (wildcats) and curved surfaces such as ships stems and hawsepipe knuckles despite high bending stresses arising in particular links when in a pocketed driving or idling wheel and when a link of the chain is supported at a centrally located fulcrum when the chain is stretched; taut around a curved surface of relatively large radius and under substantial load.

In a pocketed wheel, each alternate link is supported at its shoulders while lying flat in a pocket and load is applied to it by the next link pivoting freely on it in a groove in the wheel at right angles to the bottom of the pocket. This produces an appreciable eccentricity between load application and support and gives rise to a large bending moment which induces very high bending stresses in the pocketed link. The uniform round bar of the link does not provide the best shape, orientation, and position of sections to minimise and bear these induced bending stresses.

Further, when a stud-link chain is stretched taut round a curved surface the links automatically tilt to an inclination of about 45 degrees to the surface since this is the condition of minimum potential energy with the axis of the chain at the smallest possible separation from the surface. In this attitude, due to the oval shape of each link, the links are supported obliquely at centrally located contact or fulcrum points adjacent the studs and so experience very high bending stresses which often damage the links. The most serious damage possibility occurs when a link is pressed edge-on in contact with the curved surface just prior to tilting into the 45 degree minimum energy attitude.

It is an object of the present invention to obviate or mitigate the above disadvantages.

According to the present invention a chain comprises links having opposed C-shaped ends connected by joining limb portions, the section modulus about an axis perpendicular to the plane of the link of a cross-section of a shoulder located at each side of a central crown portion of each C-shaped end being greater than the corresponding section modulus of a cross-section of said central portion and also greater than the corresponding section modulus of a cross-section of a joining limb portion.

Preferably the depth of the above cross-sections measured in the plane of the link is greater at each shoulder than at the crown and at the joining limb portions.

Preferably the above cross-sections at the crown and shoulder comprise opposed arcuate parts the radius of curvature of one of said arcuate parts being substantially greater than the radius of curvature of the other part.

Preferably the central stud is rectangular in section with a minimum dimension of stud cross-section in the plane of the link.

An embodiment of the present invention will now be described by way of example with reference to the accompanying drawings in which:

FIGS. 4 to 9 show sections of the link through sections C—C, D—D, E—E, G—G, H—H and M—M respectively in FIG. 1;

Figures 1, 2:
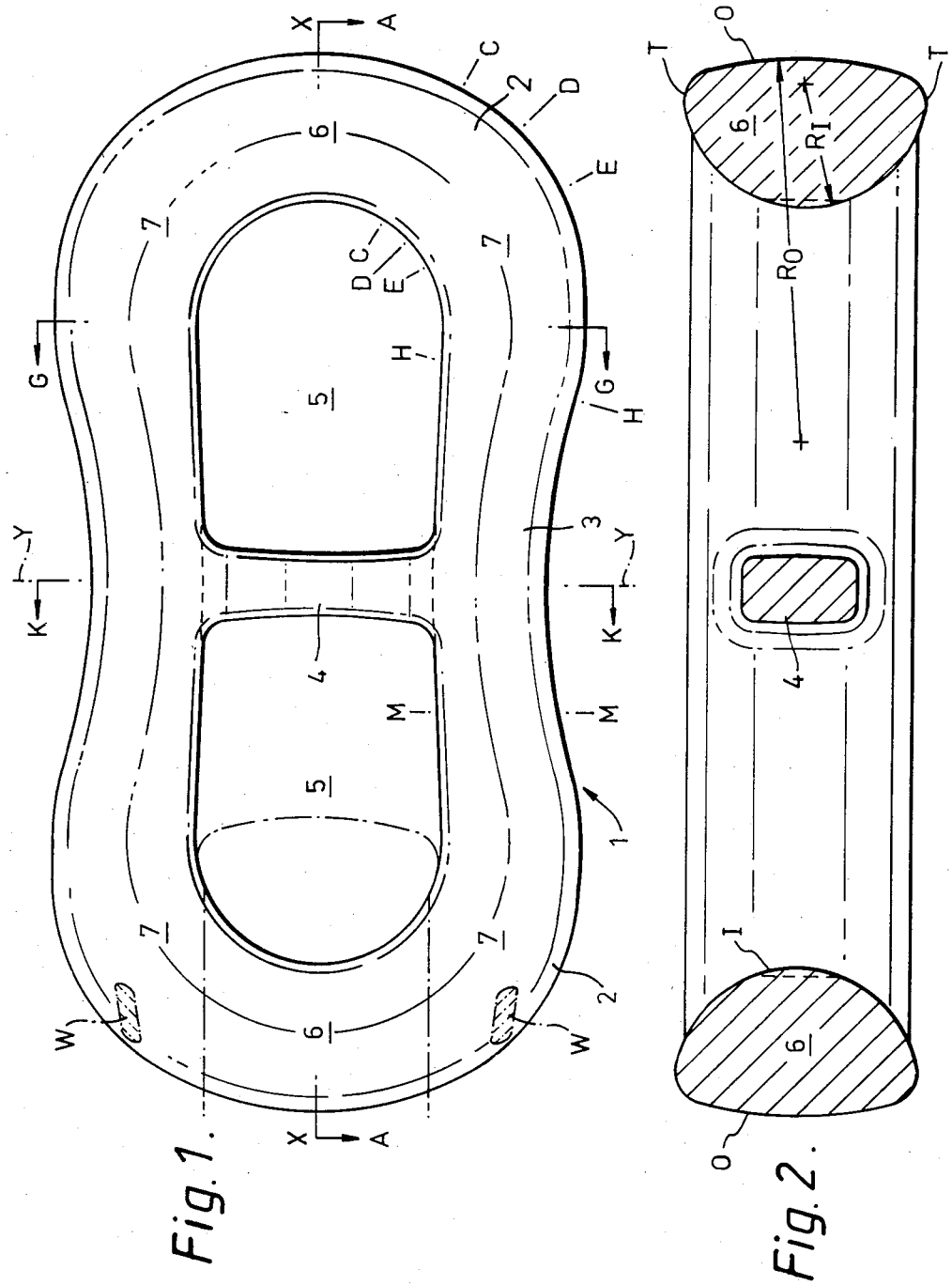
FIG. 1 shows a side view of a link of a chain according to the present invention.
FIG. 2 shows a sectional plan view of the link of FIG. 1 through section A—A.

Referring to the drawings and especially to FIG. 1, chain-cable includes a series of interlinked stud links 1 each of which is symmetrical relative to a mid-transverse axis YY of the link, each link 1 comprising C-form ends 2 joined by limb portions 3 with a central stud 4 at the limb portions 3; there is thus provided a pair of spaced apertures 5 through which adjacent links pass. Each C-form end 2 includes a crown portion 6 and shoulder portions 7 adjacent the crown portion.

The conventional round-bar stud link is usually designated by the nominal diameter D of the bar (e.g. 76 mm) and the chain pitch is defined by the formula p=4D. The present link 1 is not of round bar section but the chain pitch can be measured i.e. inside distance P between crowns and for convenience the present link is designated as if it were a round bar link from the formula, i.e. D=P/4. The links 1 can be made of alloy steel and the exemplary link is designated 76 mm.

Figure 3:
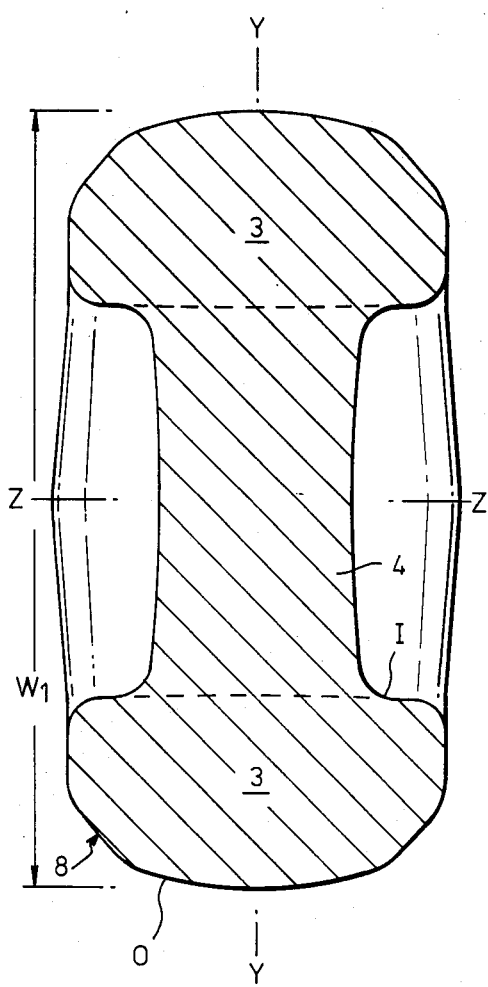
FIG. 3 shows a section of the link through section K—K of FIG. 1.

The cross section of the link 1 at the crown portion 6 approximates to an elliptic form (see FIG. 2) and has an arcuate outer surface O and an arcuate inner surface I joined to the outer surface O by side surfaces T, the outer surface O having a radius $R_O$ greater than the radius $R_I$ of the inner surface I. As can be seen from FIGS. 4 and 5 the radius $R_O$ increases substantially in the shoulder portions 7, but in the limb portions 3 the outer surfaces O have considerably scalloped sides 8, (see FIGS. 3 and 9), the tangent to the scalloped sides 8 making an angle of approximately 43° to the plane of the link, i.e. the mid-longitudinal plane XY.

Figure 7:
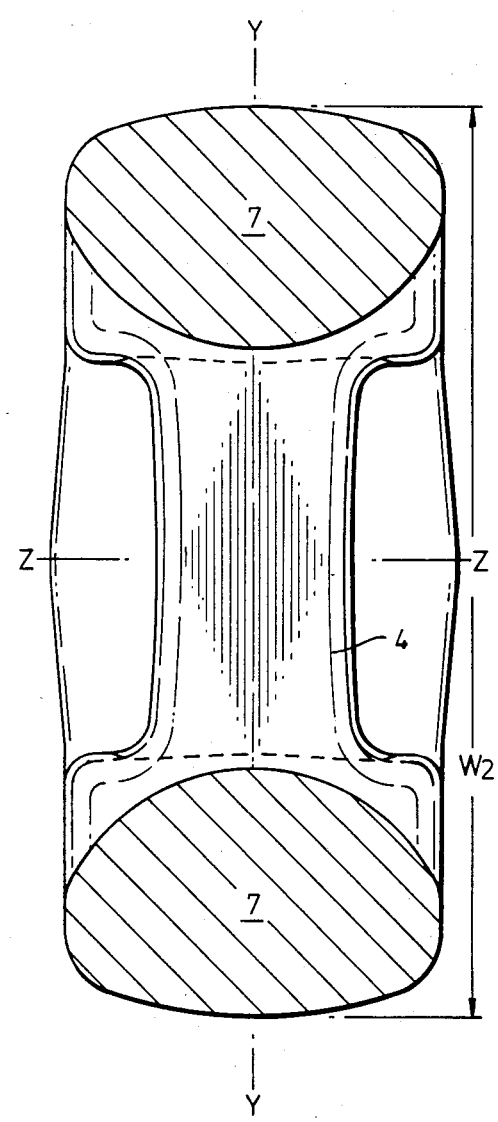
Figure 10:
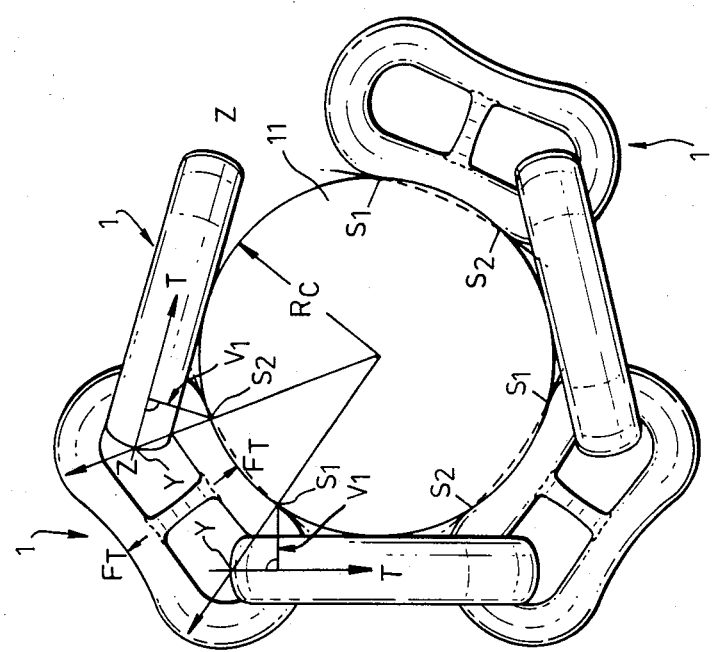
Figure 12:
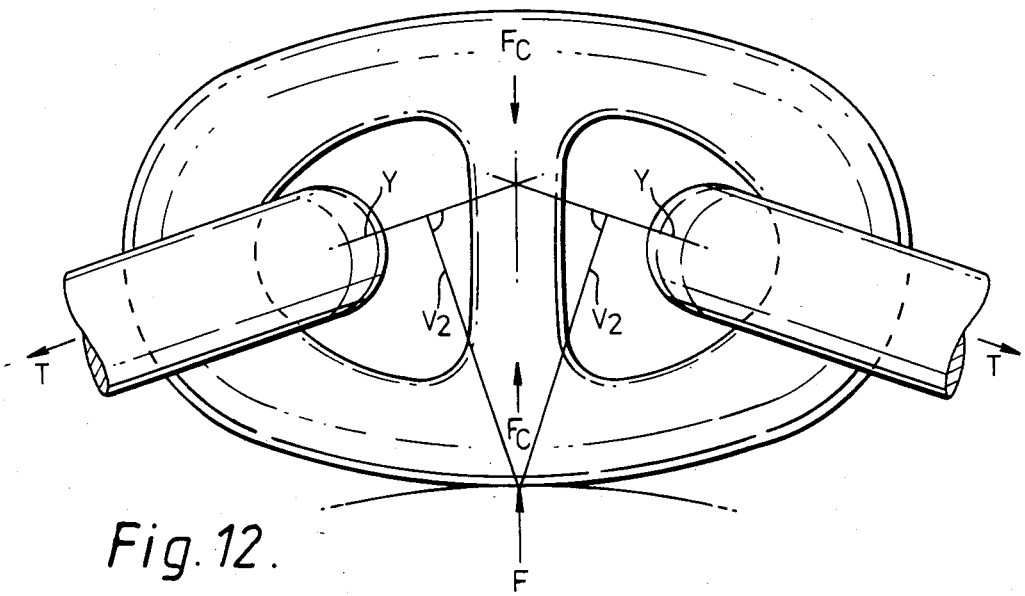

An important feature of the link 1 is that the outer surfaces O of the limb portions 3 are of a waisted form (see FIG. 1) in side view so that the width $W_1$ of the link at the mid section K—K (FIG. 3) is substantially less than the links maximum width $W_2$ which occurs at the section G—G (FIG. 7). In this example, $W_1/W_2=0.85$ but other ratios are possible e.g. the ratio may be as high as 0.97 or as low as 0.75 for operating on cylindrical surfaces of radii 20D to 1.5D. The benefits of this waisted construction will be appreciated from a consideration of FIG. 10 which shows the chain of FIG. 1 passing around a cylinder 11. Thus as can be seen, where the radius $R_c$ of the cylinder 11 is 235.6 mm (i.e. 3.1D) for the link 1 of designation 76 mm the particular links whose outer surfaces engage with the surface of the cylinder 11 do so over the entire waisted portion of the outer surface. Where the cylinder 11 has a radius $R_c$ greater than 235.6 mm (e.g. 267 mm as shown dashed in FIG. 10.), links engaging the cylinder 11 do so substantially solely at spaced points $S_1$, $S_2$. Further, for $3.1D < R_c \leq \infty$ the position of either of $S_1$ or $S_2$ lies between the sections H—H and G—G as indicated in FIG. 1. The bending moment arm $V_1$ defined by the distance from each point of contact $S_1$, $S_2$ to the plane XY of an adjacent link is less than the corresponding bending moment arm $V_2$ of the prior art link shown in FIG. 12. By virtue of the above support arrangements bending moment effects due to the oblique tensile loading T on the link 1 are considerably reduced in the link, in comparison with single mid-point loading as was the case with previous chain cable, (round bar) as shown in FIG. 12. Where the radius $R_c$ of the cylinder 11 is considerably less then 235.6 mm, the benefits with respect to bending moment reduction for the chain cable having 76 mm designated links 1 according to the present invention are not so great, but it is established practice in the art where 76 mm chain is used to utilize curvatures in chain handling appliances of a radius equal to or greater than 266 mm and it is practical and feasible to restrict similarly the radius of curvature of hawsepipe knuckles and hull plating.

Additionally the scalloped sides 8 of the limb portions 3 permit the link to rotate about its longitudinal axis x—x while in contact with a cylindrical surface having a radius $R \leq 3.1D$ so that no point loading on a fulcrum will occur at the centre of the link. Also, the scalloping is sufficient to allow up to 4° splaying of the links beyond the 90° to each other when wrapped around and in contact with a cylindrical surface.

It is a further feature of the link 1 that the shoulder portions 7 have a greater section depth, section area and section modulus than the crown portions 6. It can be seen in FIGS. 4–6 that the shoulder sections illustrated in these figures have a greater depth and area than the central crown section AA of FIG. 2 and the mid-transverse plane section KK of FIG. 3. Referring to FIG. 1, section ratios (referred to section DD) are as follows:

| SECTION | AREA | DEPTH | SECTION MODULUS |
| --- | --- | --- | --- |
| AA | 0.925 | 0.937 | 0.791 |
| BB | 0.938 | 0.944 | 0.861 |
| CC | 0.949 | 0.964 | 0.904 |
| DD | 1.000 | 1.000 | 1.000 |
| EE | 0.993 | 0.991 | 0.984 |
| FF | 0.933 | 0.952 | 0.879 |
| GG | 0.849 | 0.914 | 0.749 |
| LL | 0.747 | 0.730 | 0.566 |
| KK | 0.741 | 0.724 | 0.556 |
| 76 mm Round Bar | 0.945 | 1.206 | 1.133 |

The provision of a relatively high section modulus at section DD reduces bending stresses at the shoulders 7 where high stress concentration is known to be present in round-bar stud-link chains. Further, the progressive reduction of section modulus towards the crown encourages the crown portion 6 to 'wrap round' the crown of the next adjacent link under load both to limit the flexure and, hence, stresses in the crown 6 and to spread the load over the crown portion and so reduce the moment arm inducing bending stresses in the shoulders 7. The relatively low section moduli of the sections of the joining limbs 3 over the considerable distance between section GG and KK allow flexing to occur without unacceptably high stress concentration. The deepening of the sections at the shoulders 7 serves also to reduce the eccentricity between load application and support points in links lying flat in the pockets of driving and idling wheels and so reduce the high bending stresses induced by passage over such wheels.

The limb portions on either side of a common aperture 5 converge slightly towards the transverse midplane. The effect of this is that when the link is under tension, greatly reduced compression forces occur in the stud 4. This is in contrast to the conventional elliptical link where the corresponding limb portions diverge with the result that very high compression forces occur in the stud when the link is under tension. By virtue of the greatly reduced compression force the stud 4 can be of considerably reduced size, and this provides a saving in weight. Indeed the above link 1 of the present invention can have a weight reduction of approximately 20% over corresponding conventional stud links (round bar-)—the present 76 mm link should weigh about 32 Kg compared to 40.5 Kg for the round bar link.

A particularly significant feature of the above chain cable using the links 1 is that it can fully replace a corresponding conventional chain cable without the need for alteration in the existing chain handling equipment.

Figure 11:
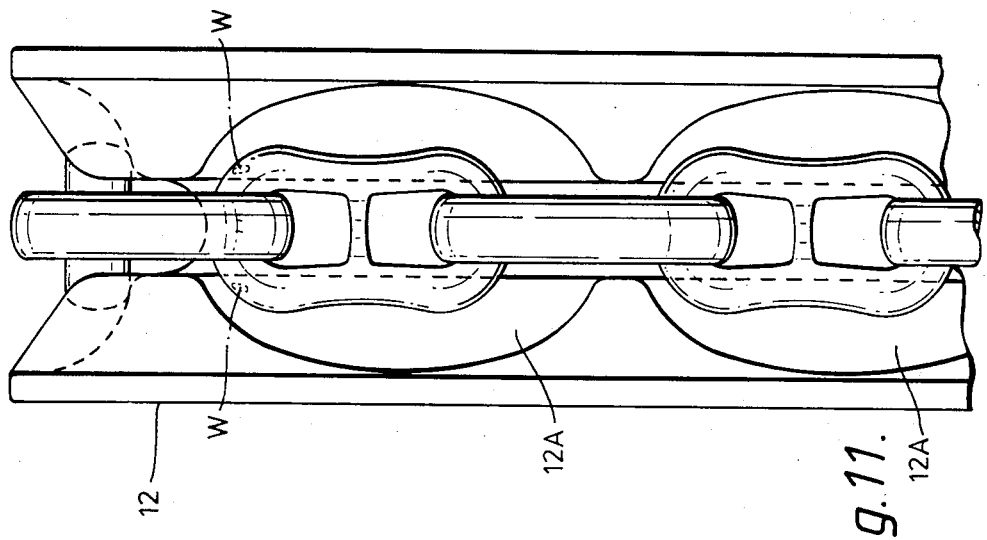
FIGS. 10 and 11 show operational modes of a chain made up of the links of FIGS. 1 to 9 and FIG. 12 shows by way of comparison operation of a prior art link chain.

The chain cable with links 1 has the following further features:

1. The thickened shoulders 7 are contoured to give the same load transfer zones as conventional stud-link chain and hence enable the link to fit conventional wildcats (cable lifters). FIG. 11 shows the chain cable of the present invention engaged in a wildcat 12 or cable lifter: the dashed line shows a conventional chain cable link in the wildcat pocket 12A. The load transfer zones are marked W in FIGS. 1 and 11.

2. Close toroidal fit-up is provided at the crown to give spread support between links.

3. The section modulus of centre sections KK for bending transverse to the plane of the link exceeds that of conventional round bar stud links of equal pitch by $5\frac{1}{2}\%$.

4. The width of the crown 6 of a C-end at section AA is within 5% of the maximum separation between side limbs of adjacent link.

5. Torsional flexibility of the present chain when taut for elastic deformation without permanent set, is $\pm 3\frac{1}{2}°$ over each pitch length of the chain.

The links can be made by a casting operation, but can also be made by forging for example using the techniques described in UK Pat. Nos. 353 131; 730 811 and 822 241.

The above chain cable of the present invention further avoids the following disadvantages of conventional elliptic stud link chain:

(a) Round-bar elliptical stud-link chain has a uniform limb cross-sectional area which is not uniformly stressed under load so giving rise to localised high stress concentrations, which shortens greatly the fatigue life, and to unnecessarily high link weight which gives low specific strength.

(b) The relatively long stud at the minor diameter of the ellipse must be of thick section to carry the large compressive loads of approximately 40 percent of chain tension resulting from the elliptical form of the links and so makes the stud-link unnecessarily heavy.

(c) The very small contact areas between the load transfer surfaces of adjacent links encourages rapid wearing down of these load transfer surfaces.

Modifications are of course possible. For example, the cross-sections of the link could be of some other form than those shown. Indeed the present invention encompasses a 'waisted' form link where the link has cross sections of substantially circular form. In a modification, the inner surface of the crown has a flattened portion as shown dashed in FIG. 2 to enforce load spreading between adjacent links despite manufacturing tolerances and, in particular, to reduce bending moment within each link by splitting the resultant applied tensile load in two halves each spaced from the axis of the chain whereby the moments of each said half of the resultant applied tensile load about the neutral axis of adjacent highly stressed sections (for example, sections DD, EE and FF) are substantially reduced and, consequentially, the peak tensile stresses at such sections are also substantially reduced. Typically the flattened portion shown dashed would be 20 mm to 40 mm wide for 76 mm chain.

Figure 15:
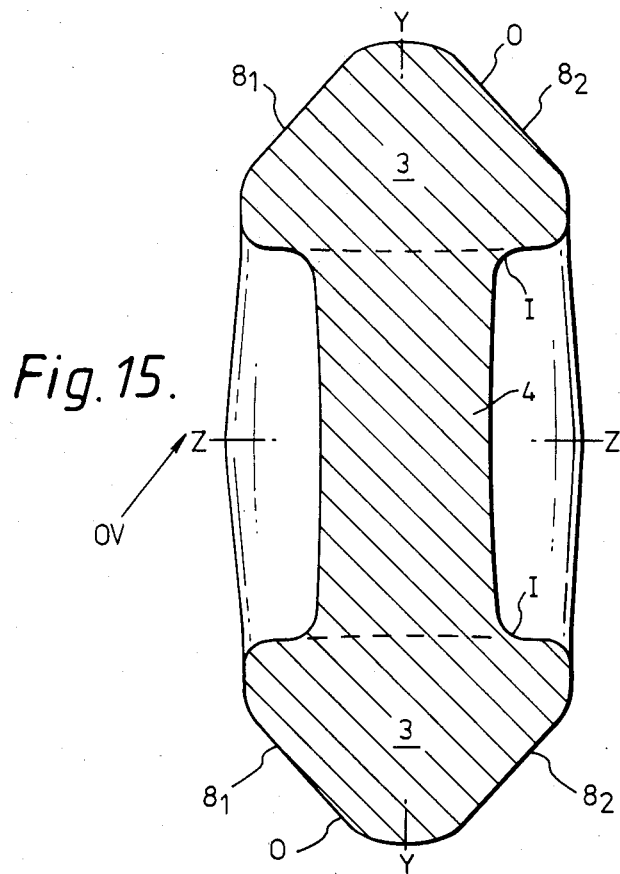
FIGS. 14 and 15 show a side elevation and a sectional end view (through section K—K) of a modified link according to the present invention.
Figure 14:
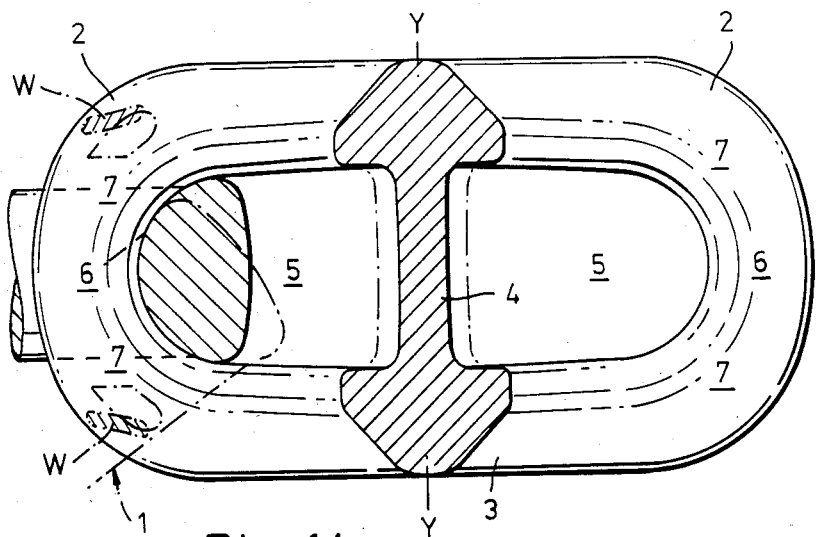

Whereas FIG. 1 shows the chain link waisted as viewed at right angles to the plane of the link XY, it would be possible for the link to be arranged such that the waisting effect is present when the link is viewed at an angle in the range of 40° to 90° to the plane of the link, even although the link is not so waisted when viewed at right angles to the plane XY. FIGS. 14 and 15 show this alternative construction: when the link of FIG. 15 is viewed in the direction of arrow OV a waisting effect will be apparent by virtue of the diagonally disposed scallops $8_1$ and $8_2$. When the link of FIGS. 14 and 15 is supported on a cylindrical surface of radius 3.1D and with the plane of the link XY oblique to the axis of the cylinder, the link will be supported in roughly the same manner as described for the link shown in FIG. 10 and this will provide reductions in bending moment stress in comparison with conventional round bar link. In particular when the cylinder radius is greater than 3.1D, the link will have spaced two point contact on the cylindrical surface. The link construction of FIGS. 14, 15 will have definite benefits since the normal operational mode of a chain passing around a cylindrical non-pocketed fairlead is with the links oblique to the fairlead axis (e.g. at 45°). For satisfactory stressing characteristic of the modified link, the cross sectional area at the waisted part is maintained roughly equal to that of the link of FIG. 1 (for 76 mm link): this results in the sides of the apertures 5 being of slightly diverging form as will be apparent in FIG. 14 whereby the stud 4 becomes subject to higher compressive loads.

Figure 13:
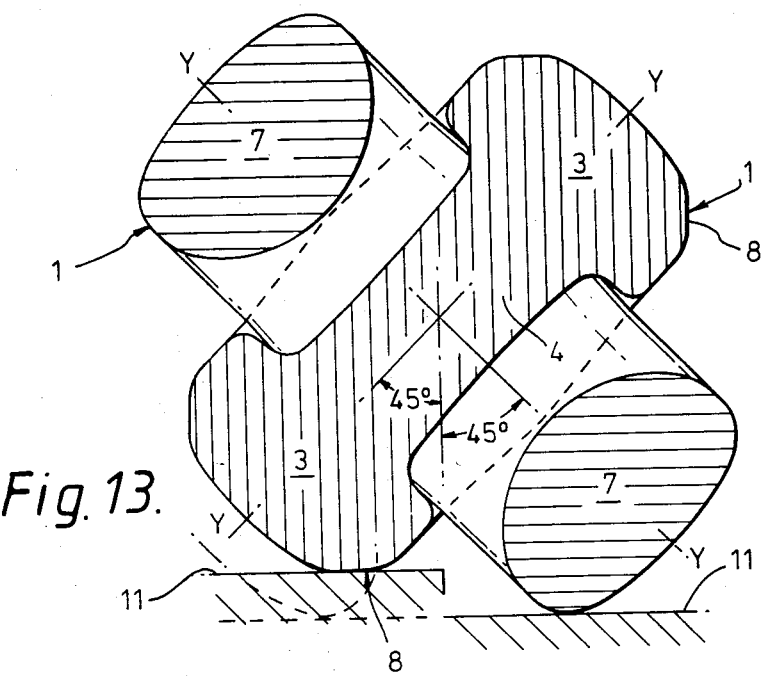
FIG. 13 shows in sectional end view the chain of FIG. 1 obliquely supported on a cylindrical surface.

FIG. 13 shown the chain of FIG. 1 supported on a cylindrical surface 11 having a radius of 3.1D and at an oblique angle to the surface, i.e. the mid transverse axis Y—Y is oblique to the centre line (not shown) of the cylindrical surface 11: the scalloped portion 8 enables the supported chain link to "wrap round" the cylindrical surface. The chain of FIGS. 14, 15 will be supported in a similar manner as in FIG. 13 when the chain links are arranged in oblique fashion as shown.

I claim:

1. A chain comprising a series of interconnected links, each link comprising a pair of opposed C-shaped ends joined by joining limb portions when viewed at right angles to a longitudinal plane of symmetry bisecting said C-shaped ends and said joining limb portions, said longitudinal bisecting plane defining the plane of the link, each C-shaped end including a central crown portion and shoulders located on each side of said central crown portion, the section modulus about an axis perpendicular to said plane of the link of a cross-section of each shoulder being greater than the corresponding section modulus of a cross-section of the corresponding central crown portion.

2. A chain as claimed in claim 1, wherein the depth of said cross-sections as measured in said plane of the link is greater at each shoulder than at the central crown portion.

3. A chain as claimed in claim 2, wherein cross-sections at the central crown portion and the corresponding shoulders comprise opposed arcuate parts, the radius of curvature of one of said arcuate parts being substantially greater than the radius of curvature of the other part.

4. A chain as claimed in claim 1, wherein the link has a central stud.

5. A chain comprising a series of interconnected links, each link comprising a pair of opposed C-shaped ends joined by joining limb portions when viewed at right angles to a longitudinal plane of symmetry bisecting said C-shaped ends and said joining limb portions, said longitudinal bisecting plane defining the plane of the link, each C-shaped end including a central crown portion and shoulders located on each side of said central crown portion, the section modulus about an axis perpendicular to said plane of the link of a cross-section of each shoulder being greater than the corresponding section modulus of a cross-section of the corresponding central crown portion and also greater than the corresponding section modulus of a cross-section of the corresponding joining limb portion.

6. A chain as claimed in claim 5, wherein the depth of the said cross-sections as measured in the plane of the link is greater at each shoulder than at the central crown portion and at the joining limb portions.

7. A chain as claimed in claim 6, wherein cross-sections at the crown and at the corresponding shoulders comprise opposed arcuate parts, the radius of curvature of one of said arcuate parts being substantially greater than the radius of curvature of the other part.

8. A chain as claimed in claim 5, wherein the link has a central stud.

9. A chain as claimed in claim 8, wherein the central stud is rectangular in section with a minimum dimension of stud section in the plane of the link.

10. A chain as claimed in claim 5, wherein each link is constructed such that the external profile of the link is of waisted form at said joining limb portions when viewed at right angles to said plane of the link.

11. A chain as claimed in claim 1, wherein each link is constructed such that the external profile of the link at said joining limb portions is of scalloped form when viewed at an angle to said plane of the link in the range 40° to 90°.

12. A chain as claimed in claim 10, wherein the waisted part of the link has a width not greater than 95% of the maximum width of the link, said width being measured in the plane of the link.

13. A chain as claimed in claim 12, wherein the waisted part has a width reduction of at least 10% relative to the maximum width of the link.

* * * * *